United States Patent [19]
Ozaki et al.

[11] Patent Number: 6,106,961
[45] Date of Patent: Aug. 22, 2000

[54] SLIDING SHEET MATERIAL FOR HIGH-TEMPERATURE USE AND PACKING

[75] Inventors: Kouki Ozaki; Masatoshi Inoue; Shigehiro Kawai; Yutaka Yamada; Hideyumi Matsumura; Takayuki Shibayama, all of Nagoya, Japan

[73] Assignee: Daido Metal Company Ltd., Nagoya, Japan

[21] Appl. No.: 09/084,215

[22] Filed: May 26, 1998

[30] Foreign Application Priority Data

Jul. 14, 1997 [JP] Japan ..................................... 9-205381

[51] Int. Cl.$^7$ ....................................................... B32B 9/00
[52] U.S. Cl. ........................ 428/698; 428/609; 428/457; 428/195; 442/6; 442/16; 442/43
[58] Field of Search ................. 428/698, 457, 428/609, 195; 442/6, 16, 43

[56] References Cited

U.S. PATENT DOCUMENTS

| | | |
|---|---|---|
| 3,404,061 | 10/1968 | Shane et al. . |
| 4,455,334 | 6/1984 | Ogino et al. . |
| 4,516,782 | 5/1985 | Usher .......................................... 277/1 |
| 4,547,434 | 10/1985 | Sumiyoshi et al. ..................... 428/609 |
| 4,551,393 | 11/1985 | Sumiyoshi et al. . |
| 4,559,248 | 12/1985 | Sumiyoshi et al. .......................... 442/5 |
| 4,559,249 | 12/1985 | Arigaya et al. .............................. 28/35 |
| 4,607,851 | 8/1986 | Usher .......................................... 277/1 |
| 5,040,805 | 8/1991 | Ozora . |
| 5,451,064 | 9/1995 | Mercuri et al. . |
| 5,499,825 | 3/1996 | Maeda et al. ........................... 277/100 |

FOREIGN PATENT DOCUMENTS

| | | |
|---|---|---|
| 60-084477 | 5/1985 | Japan . |
| 60-84477 | 5/1985 | Japan . |
| 1-307591 | 12/1989 | Japan . |
| 2031074 | 4/1980 | United Kingdom . |
| 1602989 | 11/1981 | United Kingdom . |
| 2214130 | 8/1989 | United Kingdom . |

*Primary Examiner*—Deborah Jones
*Assistant Examiner*—Jason Resnick
*Attorney, Agent, or Firm*—Browdy and Neimark

[57] ABSTRACT

There is disclosed a sliding sheet material for high-temperature use which can be easily produced, and has satisfactory durability while maintaining excellent properties of exfoliated graphite such as cushioning properties and heat-resistance. The sliding sheet material includes a sheet-shaped exfoliated graphite, and at least two layers of wire net embedded in the exfoliated graphite sheet, the wire net layers being disposed substantially parallel to each other. The wire net layers are partially exposed to obverse and reverse sides of the exfoliated graphite. The satisfactory durability of the sliding sheet material is achieved by the exposed wire nets, and the sliding sheet material can be easily produced, and exhibits excellent cushioning properties and heat resistance.

9 Claims, 5 Drawing Sheets

SLIDING SHEET MATERIAL FOR HIGH-TEMPERATURE USE AND PACKING

BACKGROUND OF THE INVENTION

1. Field of the Invention

This invention relates to a sliding sheet material for high-temperature use which is to be interposed between members in sliding contact with each other, such as a bearing bushing, a washer and a packing.

2. Related Art

For example, an exhaust conduit of an automobile engine is heated to high temperatures, and also vibrations of the engine are propagated to the exhaust conduit. Therefore, it is a common practice in the art to interpose a sliding member, such as a packing, at an interconnecting portion of the exhaust conduit where exhaust pipes are serially connected together, so as to prevent a gas leakage and also to dampen the vibrations.

JP-A-60-84477 (prior art technique 1) discloses a sliding member such as a packing, in which a band-like, tubular matrix and a band-like, sliding face-forming member are placed one upon the other (that is, stacked together), and are compressed and deformed, so that metal wires are partially exposed to the surface of the sliding member. The tubular matrix is formed by superposing a wire net of a thin stainless steel wire on a heat-resistant sheet material made, for example, of exfoliated graphite, and then by coiling these materials into a roll-like configuration, and then by crushing and flattening the materials of the roll-like configuration into a band-like configuration. The sliding face-forming member is formed by the steps of placing a heat-resistant sheet, made for example of asbestos, on an exfoliated graphite sheet, applying a powdered solid lubricant onto this heat-resistant sheet, overlaying a composite net (formed by weaving or knitting a thin metal wire and a fluororesin thread together) on these materials, and crushing and flattening the stacked materials into a band-like configuration. Then, the two members thus produced are stacked together, and are compressed and shaped into the packing. Therefore, this sliding member has the sliding surface on which the fluororesin, the thin metal wire and the solid lubricant are present in a mixed manner, and therefore this sliding member exhibits excellent sliding properties over a long period of time.

A packing, disclosed in JP-A-1-307591 (prior art technique 2), is formed by superposing one wire net (expanded metal) on one sheet of exfoliated graphite, and then by coiling these materials into a roll-like configuration, and then by compressing and shaping the coiled materials into a final shape of the packing. Therefore, the packing can be easily produced, and is less susceptible to damage.

In both of the sheet materials (packings) of prior art techniques 1 and 2, the wire net and the exfoliated graphite sheet are stacked together, and then are coiled into a roll-shaped configuration. Therefore, each of the resultant sheet materials has an increased thickness, and there has been a limit to the formation of these sheet materials into a reduced thickness. And besides, the construction of these sheet materials is complicated, and their cost is high.

There is already known a sliding sheet material of the type in which one wire net is superposed on one exfoliated graphite sheet, and then these are compressed, so that the wire net is covered with the exfoliated graphite sheet, with the exfoliate graphite sheet filled in the meshes (interstices) in the wire net. More specifically, the filling with respect to this sliding sheet is effected in the following manner. The wire net 51 is superposed on the exfoliated graphite sheet 50 as shown in FIG. 7A, and then the compression is effected as shown in FIG. 7B. At this time, if the compression is excessive, not only an obverse side 50a of the exfoliated graphite sheet 50 but also a reverse side 50b thereof are cut by metal portions forming the meshes of the wire net 51, as shown in FIG. 7C, so that the exfoliated graphite sheet 50 is liable to become separated from the wire net 51. Therefore, at the time of effecting the compression, the compressive force is so adjusted that the reverse side 50b will not be cut, as shown in FIG. 7D. Namely, only the obverse side 50a is cut, and the reverse side 50b is kept continuous by a layer portion "n" which is not cut.

Therefore, the wire net is not exposed to the reverse side 50b, and is covered with the exfoliated graphite sheet at the reverse side 50b. The exfoliated graphite sheet and the wire net are present in the obverse side 50a in a mixed manner. This sliding sheet material is cut and shaped into a packing or the like in which at least one side or face thereof is completely covered with the exfoliated graphite having insufficient wear resistance, and therefore when the packing is worn into a reduced thickness, this causes a backlash. Besides, when the wire net becomes exposed as a result of wear, there is encountered a problem that the opposite (both) sides of the exfoliated graphite sheet are divided by the meshes of the wire net, so that the exfoliated graphite sheet is susceptible to separation.

SUMMARY OF THE INVENTION

It is therefore an object of this invention to provide a sliding sheet material for high-temperature use which can be easily produced and which has satisfactory durability while maintaining excellent properties of exfoliated graphite such as cushioning properties and heat-resistance.

According to the first aspect of the invention, there is provided a sliding sheet material for high-temperature use comprising:

an sheet-shaped exfoliated graphite; and at least two layers of wire net embedded in the exfoliated graphite, the plurality of wire net layers being disposed substantially parallel to each other;

the wire nets being partially exposed on obverse and reverse surfaces of the exfoliated graphite layer.

The wire net layers increase the holdability of the exfoliated graphite sheet, and also increase the mechanical strength of the sheet material. Preferably, each of the wire net layers comprises an expanded metal or a plain-weave wire net in which intersections of warp threads and weft threads are interconnected. The reason for this is that the warp thread and the weft thread at the intersection will not be displaced with respect to each other upon application of a shearing force to the sheet material, so that the holdability of the exfoliated graphite is enhanced. Particularly, the expanded metal is formed by forming slits in a metal sheet in a staggered manner, and then by expanding this metal sheet, so that the resultant expanded metal has sharp edges, and therefore the expanded metal has the enhanced ability of holding the exfoliated graphite layer.

The sheet-shaped exfoliated graphite exhibits excellent properties such as cushioning properties and heat resistance, and also possesses excellent conformability with the mating material.

When the sliding sheet material according to the first aspect of the invention is used as a sliding sheet material interposed between members in sliding contact with each other, there sometimes occurs a discontinuous slip phenomenon called "stick slip" because the exfoliated graphite is higher in friction coefficient than ordinary graphite, and noises (abnormal sound) may, in some cases, occur due to this stick slip. In such a case, it is preferred that not more than 30 wt. % of a solid lubricant be contained in the exfoliated graphite layer so as to lower its friction coefficient (the second aspect of the invention).

Examples of the solid lubricant include C (carbon, graphite), BN, $CaF_2$, $BaF_2$, NaF, LiF, $MoO_3$, $MOS_2$ and $WS_2$. Particularly, C and BN, which are excellent in heat resistance, are preferred. If the amount of the solid lubricant, added to the exfoliated graphite, is more than 30 wt. %, the formability thereof is lowered, and therefore this content should be not more than 30 wt. %. If this content is less than 1 wt. %, the satisfactory effect can not be achieved by the addition of the solid lubricant, and therefore it is preferred that this content be 1 to 30 wt. %.

Preferably, a binder, such as a phenolic resin, an epoxy resin, a polyimide resin and a polyamide-imide resin, is added in an amount of 1 to 15 wt. % since such binder enhances the holdability of the exfoliated graphite. Further, the heat resistance can be enhanced by the addition of vermiculite.

According to the third aspect of the invention, the sliding sheet material can be covered with a film of a solid lubricant such as boron nitride, and with this structure the sliding sheet material becomes more excellent in wear and friction properties.

When forming the sliding sheet material according to the first aspect of the invention, the wire nets are put respectively on the opposite (obverse and reverse) sides of an exfoliated graphite sheet, and then they are compressed. At this time, the compressive force, as well as the thickness of the exfoliated graphite sheet, is so adjusted that the wire nets can be partially exposed respectively to the opposite sides of the exfoliated graphite sheet, and the sliding sheet material can be completed simply by the compression process. In the thus obtained sliding sheet material for high-temperature use, the wire net layers are partially exposed to the opposite (obverse and reverse) sides of this sheet material, and has the sliding surfaces covered with the exfoliated graphite, and therefore this sliding sheet material exhibits the excellent sliding properties and wear resistance.

The sliding sheet material for high-temperature use according to the first aspect of the invention comprises the sheet-shaped exfoliated graphite, and a plurality of layers of wire net embedded in the sheet-shaped exfoliated graphite, and the plurality of wire net layers are disposed substantially parallel to each other, and the wire net layers are partially exposed to the obverse and reverse surface of the exfoliated graphite matrix.

Because of this structure, the sliding sheet material can be easily produced, and has satisfactory durability while maintaining excellent properties of exfoliated graphite such as cushioning properties and heat-resistance.

Particularly when 1 to 30 wt. % of a solid lubricant is contained in the exfoliated graphite, its friction coefficient can be lowered, and stick slip can be prevented from occurring (the second aspect of the invention). Further, when the sheet-shaped exfoliated graphite is covered with a film of boron nitride having a thickness of several ten μm, e.g., at least 20 μm, the sliding sheet material becomes more excellent in friction properties and wear resistance (the third aspect of the invention).

According to the fourth aspect of the invention, a packing is formed by the sliding sheet material according to any one of the first to third aspects of the invention, and this packing can be easily produced, and exhibits the excellent wear resistance.

DESCRIPTION OF THE PREFERRED EMBODIMENTS

A preferred embodiment of the present invention, in which expanded metals are used as wire net layers, will now be described in detail.

Figure 1:
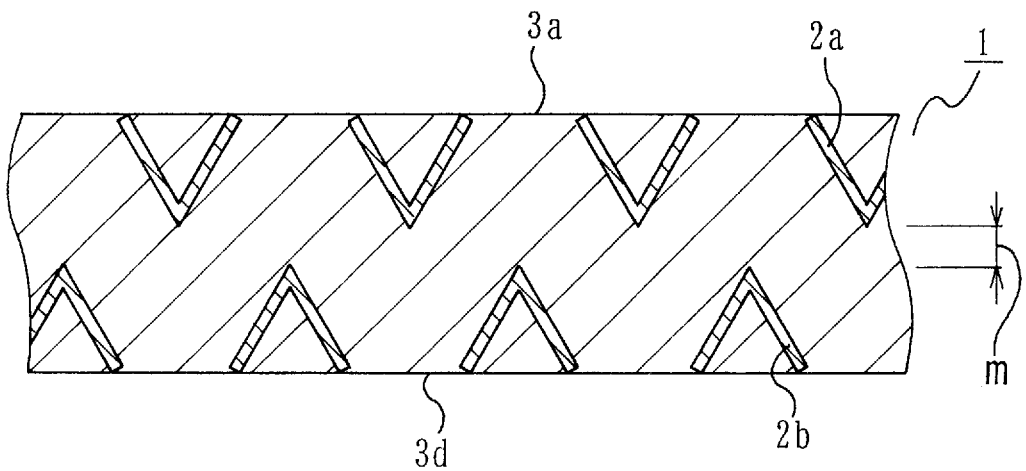
FIG. 1 is a cross-sectional view of a portion of a sliding sheet material according to the first embodiment of the invention.
Figure 2:
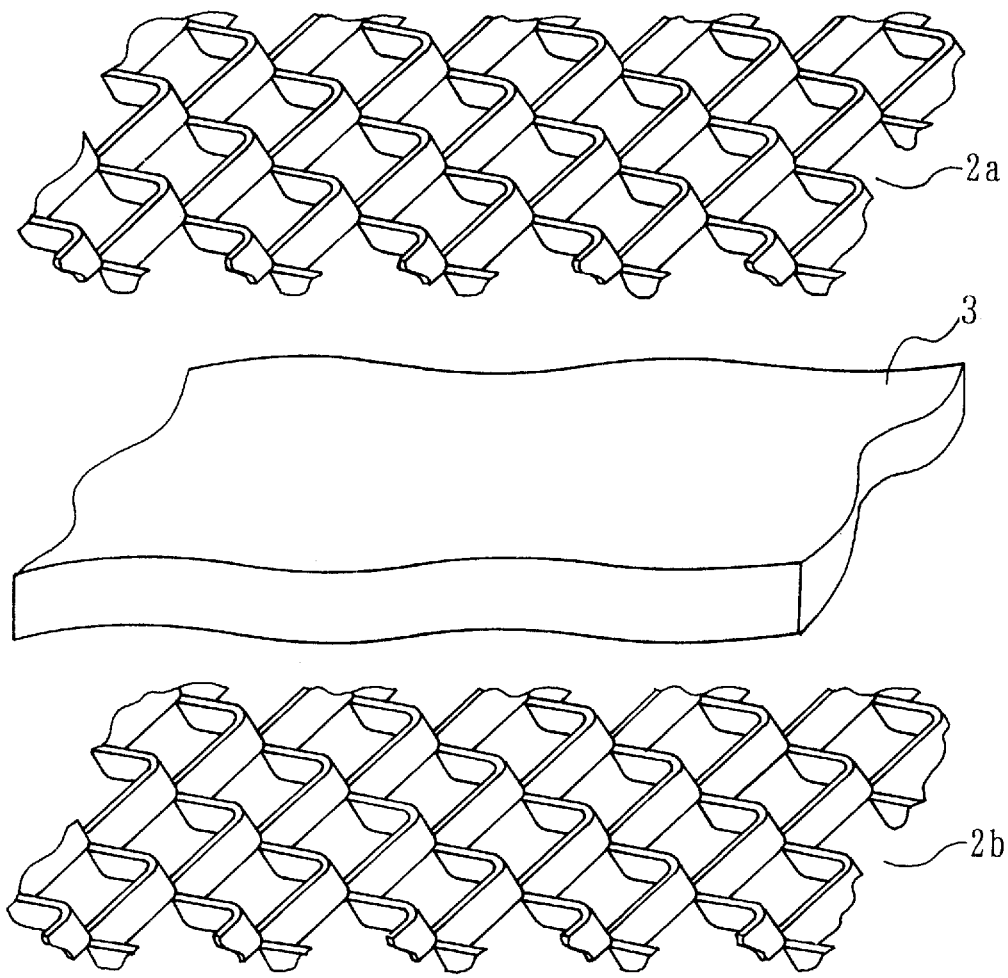
FIG. 2 is an exploded, perspective view of a portion of the sliding sheet material of FIG. 1.

For producing a sliding sheet material 1 (shown in FIG. 1) having two layers of expanded metal 2a and 2b embedded therein, the expanded metals 2a and 2b (each made of a stainless steel sheet having a thickness of 0.4 mm) were put respectively on opposite (obverse and reverse) sides of an exfoliated graphite sheet 3 (which was produced and sold under the name of "EXP Sheet" by Nippon Kokuen Kogyo Company) having a thickness of 1.0 mm, and then the expanded metal sheets were embedded in the exfoliated graphite sheet by a roll pressure, thereby forming the sliding sheet material 1. In the thus formed sliding sheet material 1, the expanded metal layers 2a and 2b were partially exposed respectively to the obverse and reverse sides 3a and 3b of the sheet-shaped exfoliated graphite 3. A layer m (having a thickness of 0.2 mm), composed solely of the exfoliated graphite 3, was formed between the two expanded metal layers 2a and 2b, and thus the exfoliated graphite was continuous at this layer m without being divided by the expanded metal layers 2a and 2b. Particularly, since the expanded metal layers 2a and 2b had combined nets each provided with rectangular cross section having sharp edges, the expanded metal layers had an enhanced ability of holding the exfoliated graphite.

Even in a case where the sliding sheet material 1 is formed by use of a thin exfoliated graphite sheet 3 and thick expanded metals 2a and 2b held in contact with each other with the result that there is formed no layer m of the exfoliated graphite therebetween, it will be readily appreciated that the exfoliated graphite sheet 3 is not severed for each mesh of the wire net. In this embodiment, although the expanded metals 2a and 2b, having the same thickness, were used as the wire nets, there may be used wire nets different in thickness or mesh from each other.

The exfoliated graphite sheet can be made of pure exfoliated graphite, and alternatively a binder and a solid lubricant may be added to the exfoliated graphite sheet. For example, the exfoliated graphite sheet may contain 10 wt. % phenolic resin as a binder, and may contain 7 wt. % BN and/or $CaF_2$ as a solid lubricant.

Figure 3:
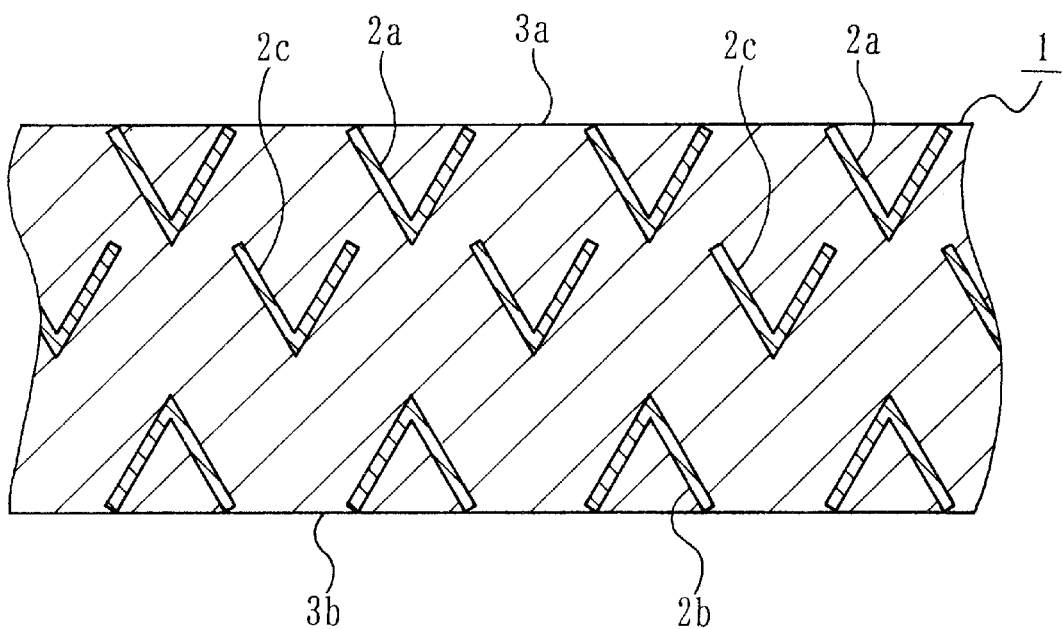
FIG. 3 is a cross-sectional view of a portion of the sliding sheet material according to the second embodiment of the invention

FIG. 3 shows another embodiment of a sliding sheet material 1 having three expanded metal layers 2a, 2b and 2c embedded therein. In this sliding sheet material 1, two expanded metals 2a and 2c were stacked on an obverse side 3a of an exfoliated graphite sheet 3 while one expanded metal 2b was put on a reverse side 3b of the exfoliated graphite sheet 3, and they were combined together by roll pressure. In the thus formed sliding sheet material 1, the expanded metal layers 2a and 2b were partially exposed respectively to the opposite (obverse and reverse) sides of sheet-shaped exfoliated graphite 3. In this manner, in accordance with the required cushioning properties of the sliding sheet material 1, a suitable number of (for example, three or four) expanded metals may be embedded in the exfoliated graphite sheet.

Description will now be made of a packing 4 which was formed of the sliding sheet material 1 of the above embodiment, and was provided at an interconnecting portion of an exhaust conduit of an automobile shown in FIG. 4.

Figure 4:
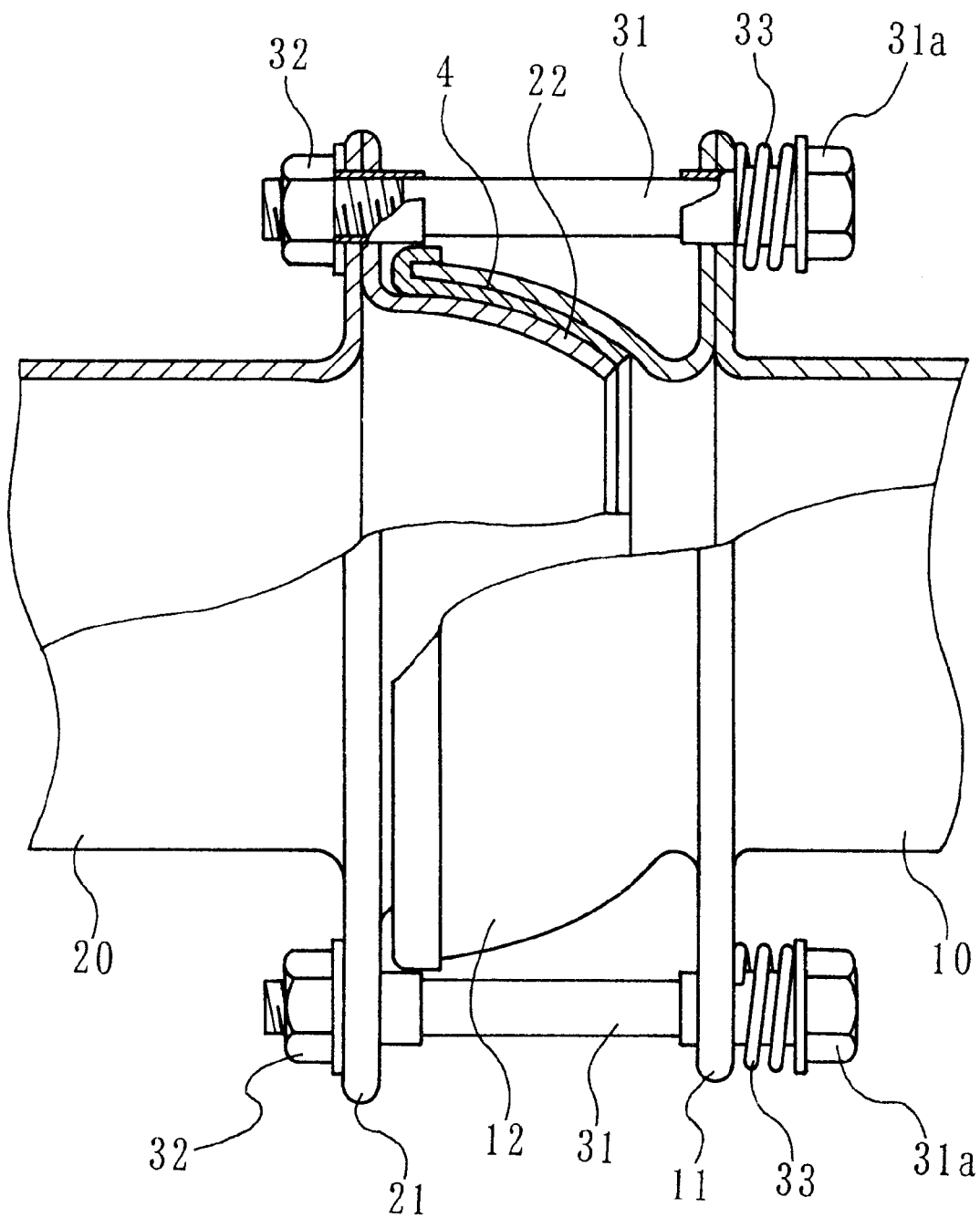
FIG. 4 is a partly-broken, cross-sectional view of an exhaust conduit in which a packing made by use of the sliding sheet material of the invention is used.

FIG. 4 shows the interconnecting portion of the exhaust conduit of the automobile at which the packing 4 was provided. A flange 11 was provided at an end of an engine-side exhaust pipe (outer pipe) 10, and an outer spherical portion 12, bulged into a generally semi-spherical shape, was provided on this flange 11. A flange 21 was provided at an end of an exhaust-side exhaust pipe (inner pipe) 20, and an inner spherical portion 22 of a generally semi-spherical shape was also provided on this flange 21, and the inner spherical portion 22 was disposed in contiguous relation to an inner surface of the outer spherical portion 12. The inner spherical portion 22 had a plurality of slits (not shown) which imparted resiliency (i.e., spring properties) to the inner spherical portion 22. The inner spherical portion 22 was inserted into the outer spherical portion 12, with a sliding tube (packing) 4 interposed therebetween, and the flanges 11 and 21 were interconnected by bolts 31 and nuts 32, thus serially connecting the outer and inner peripheral portions 12 and 22 together. A compression spring 33 was interposed between the flange 11 and a head 31a of each bolt 31, and these compression springs 33 resiliently pressed the outer pipe 10 and the inner pipe 20 against each other.

Figure 5:
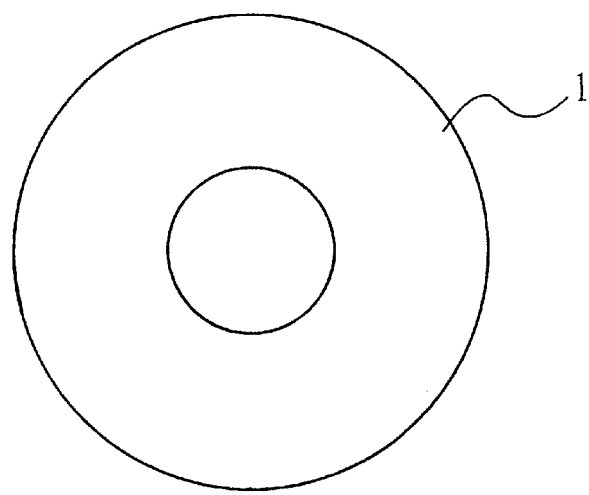
FIG. 5 is a front-elevational view of a sliding sheet member formed by cutting the sliding sheet material of the invention which member is to be used for the production of the packing of FIG. 4.
Figure 6:
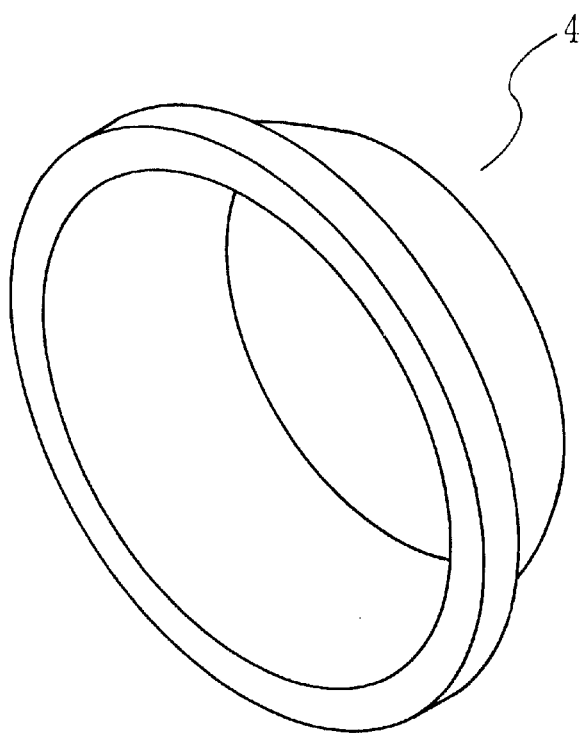
FIG. 6 is a perspective view of the packing of FIG. 4.
Figure 7A:
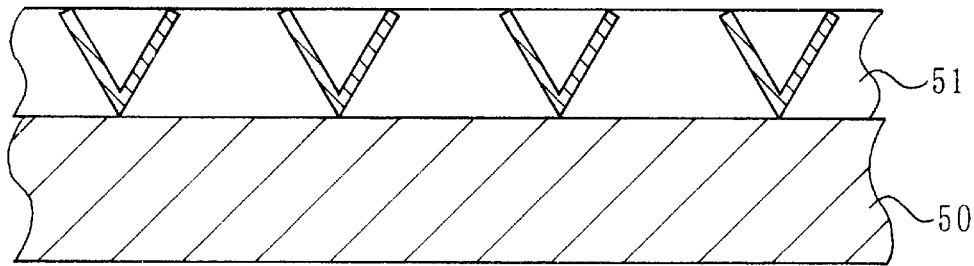
FIGS. 7(A) to 7(D) are fragmentary cross-sectional views showing the steps of a process of forming a conventional sheet member.
Figure 7B:
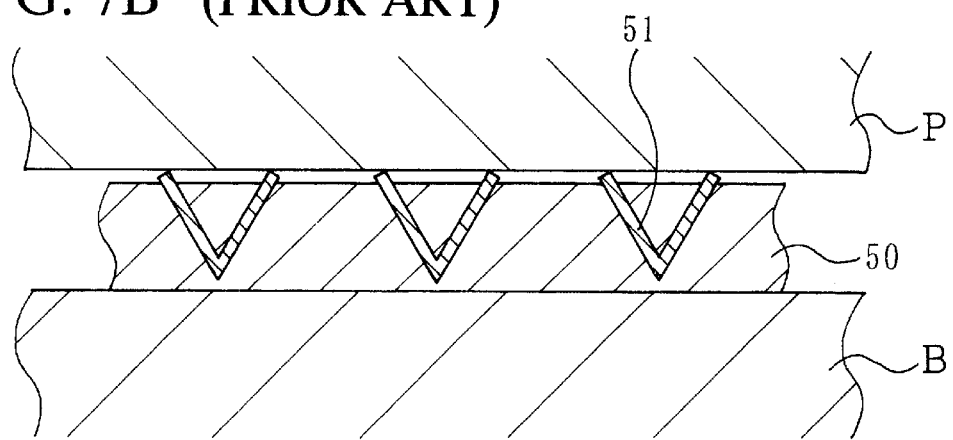
Figure 7C:
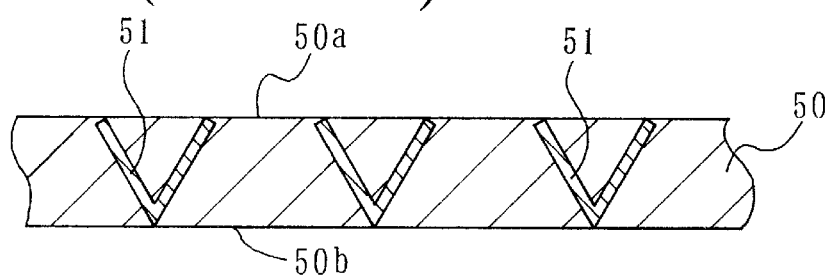
Figure 7D:
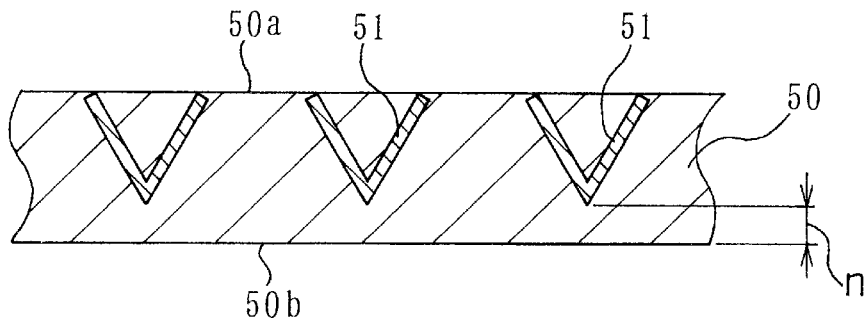

The packing 4, used in the exhaust conduit of this construction, was formed by cutting the sliding sheet material 1 into a ring-shape of a predetermined size as shown in FIG. 5, and then by plastically deforming this ring into a predetermined shape by a pressing machine, thereby providing the packing 4 shown in FIG. 6.

When an engine (not shown) was driven, high-temperature exhaust gas, flowing through the engine-side outer pipe 10 in the exhaust conduit incorporating the thus formed packing 4, was discharged to the exterior via the inner pipe 20. The outer pipe 10 and the inner pipe 20 were heated to high temperatures by this high-temperature exhaust gas. At this time, vibrations of the outer pipe 10 occur by the driving of the engine, and vibrations of the inner pipe 20 were greatly relieved by both of the resiliency of the compression springs 33 and the spring properties of the inner spherical portion 22, however, the inner spherical portion 22 and the outer spherical portion 12 repeatedly slide slightly relative to each other through the packing 4. The vibrations, transmitted from the outer pipe 10 to the inner pipe 20, were greatly dampened by the repeatedly-sliding packing 4.

Although this embodiment is directed to the packing 4 shaped into a tubular shape so as to be used at the interconnecting portion of the exhaust conduit of the automobile, the invention is not limited to such embodiment, and the sliding sheet material of the invention can be shaped, for example, into a seal member, a gasket and so on to be used between members in sliding contact with each other.

What is claimed is:

1. A sliding sheet material for high-temperature use comprising:

a sheet-shaped exfoliated graphite; and at least two layers of expanded metal embedded in said exfoliated graphite, said expanded metal layers being disposed substantially parallel to each other, said expanded metal being partially exposed to each of obverse and reverse sides of said exfoliated graphite.

2. A sliding sheet material according to claim 1, in which said exfoliated graphite contains 1 to 30 wt. % of a solid lubricant.

3. A sliding sheet material according to claim 1, in which the number of said expanded metal layers is two, said expanded metal layers being spaced apart from each other through an exfoliated graphite portion.

4. A sliding sheet material according to claim 3, in which said exfoliated graphite contains 1 to 30 wt. % of a solid lubricant.

5. A sliding sheet material according to claim 1, in which said sliding sheet material is covered with a film of boron nitride.

6. A sliding sheet material according to claim 2, in which said sliding sheet material is covered with a film of boron nitride.

7. A sliding sheet material according to claim 3, in which said sliding sheet material is covered with a film of boron nitride.

8. A sliding sheet material according to claim 4, in which said sliding sheet material is covered with a film of boron nitride.

9. A packing formed by use of a sliding sheet material as defined in claim 1.

* * * * *